(12) United States Patent
Khan et al.

(10) Patent No.: US 8,923,333 B2
(45) Date of Patent: Dec. 30, 2014

(54) COGNITIVE HUB FOR SELF-HEALING AND SELF-FORMING NETWORK WITH HYBRID COMMUNICATION TECHNOLOGIES

(71) Applicants: Shoab A. Khan, Islamabad (PK); Farrukh Kamran, Islamabad (PK); Atif Shabbir, Islamabad (PK); Sohail Masood Bhatti, Islamabad (PK); Umar Farooq, Islamabad (PK); Syed Siddique Ilahi, Islamabad (PK)

(72) Inventors: Shoab A. Khan, Islamabad (PK); Farrukh Kamran, Islamabad (PK); Atif Shabbir, Islamabad (PK); Sohail Masood Bhatti, Islamabad (PK); Umar Farooq, Islamabad (PK); Syed Siddique Ilahi, Islamabad (PK)

( * ) Notice: Subject to any disclaimer, the term of this patent is extended or adjusted under 35 U.S.C. 154(b) by 149 days.

(21) Appl. No.: 13/762,552

(22) Filed: Feb. 8, 2013

(65) Prior Publication Data
US 2014/0226456 A1    Aug. 14, 2014

(51) Int. Cl.
*H04J 3/16* (2006.01)
*H04W 88/10* (2009.01)
*H04W 72/12* (2009.01)
*H04L 29/06* (2006.01)

(52) U.S. Cl.
CPC .......... *H04W 88/10* (2013.01); *H04W 72/1215* (2013.01); *H04L 69/18* (2013.01)
USPC ........... 370/469; 370/223; 370/228; 370/463; 455/552.1

(58) Field of Classification Search
None
See application file for complete search history.

(56) References Cited

U.S. PATENT DOCUMENTS

| | | | | |
|---|---|---|---|---|
| 6,442,448 | B1 * | 8/2002 | Finley et al. | 700/231 |
| 6,640,239 | B1 * | 10/2003 | Gidwani | 709/203 |
| 6,646,991 | B1 * | 11/2003 | Drottar et al. | 370/238 |
| 6,650,897 | B2 * | 11/2003 | Nelson | 455/431 |
| 6,965,604 | B1 * | 11/2005 | Sato et al. | 370/401 |
| 7,362,709 | B1 * | 4/2008 | Hui et al. | 370/237 |
| 7,414,985 | B1 * | 8/2008 | Tedijanto et al. | 370/255 |
| 7,450,523 | B1 * | 11/2008 | Robertson et al. | 370/252 |
| 2001/0055351 | A1 * | 12/2001 | Malkemes et al. | 375/347 |
| 2003/0095553 | A1 * | 5/2003 | Shiomoto et al. | 370/395.52 |
| 2006/0068837 | A1 * | 3/2006 | Malone | 455/552.1 |
| 2006/0072505 | A1 * | 4/2006 | Carrillo et al. | 370/331 |
| 2008/0068141 | A1 * | 3/2008 | Yokomitsu et al. | 340/310.11 |
| 2009/0124207 | A1 | 5/2009 | Mody et al. | |
| 2009/0197595 | A1 * | 8/2009 | Kauffman et al. | 455/431 |
| 2010/0054224 | A1 * | 3/2010 | Hayduk | 370/338 |
| 2010/0110997 | A1 * | 5/2010 | Erceg et al. | 370/329 |
| 2010/0254282 | A1 * | 10/2010 | Chan et al. | 370/253 |
| 2010/0310258 | A1 * | 12/2010 | Wang et al. | 398/115 |
| 2011/0074552 | A1 * | 3/2011 | Norair et al. | 340/10.1 |
| 2012/0093035 | A1 * | 4/2012 | Kidambi et al. | 370/255 |
| 2013/0176113 | A1 * | 7/2013 | Mallin | 340/10.1 |

* cited by examiner

*Primary Examiner* — Ian N Moore
*Assistant Examiner* — Dung B Huynh
(74) *Attorney, Agent, or Firm* — Sarfaraz K. Niazi

(57) ABSTRACT

The present invention relates to the development of a device, Cognitive Communication Hub (CCH) that combines multiple and hybrid physical layers to collaborate and establish a unified network. The heterogeneous network so formed supports a whole range of bandwidth and spectrum while providing quality of service and class of service. The routing algorithm of the device is designed to explore the best route that can optimally use hybrid networking technologies to make a connection. The device has multiple interfaces and acts in an adhoc fashion. It forms multiple parallel data paths between source and destination and hence provides fault tolerance as a break down in one path does not disconnect end to end connection.

2 Claims, 5 Drawing Sheets

COGNITIVE HUB FOR SELF-HEALING AND SELF-FORMING NETWORK WITH HYBRID COMMUNICATION TECHNOLOGIES

FIELD OF INVENTION

The present invention relates to the technical field of digital communications and particularly this invention relates to the development of a Cognitive Communication Hub (CCH) that incorporates multiple communication technologies in it. The invention economically incorporates whole range of bandwidth and spectrum.

BACKGROUND OF INVENTION

For many mission critical systems, reliance on one media/network technology is not sufficient.

Prior art patents look to this problem and several protocols and multiservice devices have been developed to solve this problem. U.S. Patent Publication No. 2009/0124207 explains a MIB (Management Information base) which uses cognitive and non-cognitive planes to manage incoming information. Moreover, U.S. Patent Publication No. 2010/0110997 describes a multiservice communication device that uses plurality of transceivers that wirelessly transceive network data.

From applicant's view point, prior art work does not result in supporting whole range of bandwidth and their hybrid use in making a connection. Cognitive Communication Hub integerates multiple communication technologies in it and hence the routing algorithm may use hybrid of them to make a logical connection.

SUMMARY OF INVENTION

The object of the present invention is to develop Cognitive Communication Hub that has the ability to incorporate multiple communication technologies in it. These technologies are Ethernet, WLL, Wi-Fi, WiMax, Satellite, GPRS, HF radio, VHF, UHF, dial up and optical fiber, with provision of any future communication technology etc. Ethernet is a very high bandwidth technology while HF radio has low bandwidth. Wi-Fi is used to provide connection within a limited area whereas WiMax is used to provide broad band connectivity, and hence Cognitive Communication Hub interconnects hybrid technologies for full and redundant connectivity.

If, across a route, a link drops or is temporarily disabled or has congestion problem then the route will be deleted and another optimal route will be adopted for the transfer of information. Similarly, if across a route another link comes up which has better characteristics than the current links across the route, the new link will be adopted by the route.

CCH makes it possible for a node with HF technology to communicate to a node with VSAT technology. This is made possible by assigning routes through those nodes that have hybrid technologies.

Each type of service requires different quality of service. Some require high bandwidth, some require speed, some low cost and some low latency. Thus, depending on the required quality of service different communication technologies can be used. If a service requires high bandwidth then its bandwidth metric is given more weightage and compound metric is calculated for each node to find the optimal route.

The routing protocol is an extended version of both proactive and reactive routing protocols and is called Cognitive Protocol. The extended algorithm takes into consideration several factors when establishing routes like node congestion, cost, latency, bandwidth and speed. Each factor is given different priority for different type of service and compound metric for each node is calculated by using the formula:

$$CM_{TOSi} = \sum_{j=1}^{k} Pj_{TOSi} * RFj_{TOSi}$$

Each node maintains only that route which has the best metric and a lower one as backup route. In this way the best route is maintained.

An example scenario for Cognitive Communication Controller is also shown to explain how best link is established for communication.

DETAILED DESCRIPTION OF PREFERRED EMBODIMENTS

Figure 1:
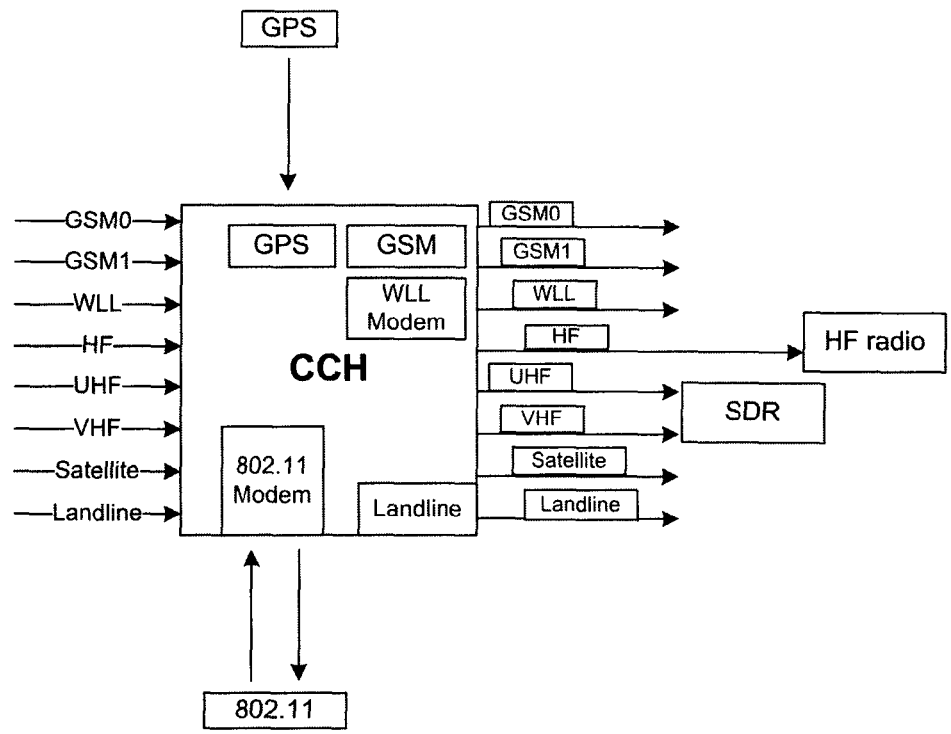
FIG. 1 shows Cognitive Communication Hub.

Referring to FIG. 1, Cognitive Communication Hub (CCH) is shown. CCH is self-forming and hence no network settings are required other than the settings required for underlying technologies and link metrics. It dynamically discovers route across multiple networks and dynamic switching occurs across links and nodes of CCH. Moreover, encryption of data is also done at the source node for the purpose of security. It has multiple communication technologies incorporated in it which are two GSM links, WLL, HF, UHF, VHF, Satellite, Landline, GPS and Ethernet. Communication can be done through any one of the above mentioned technologies.

Figure 2:
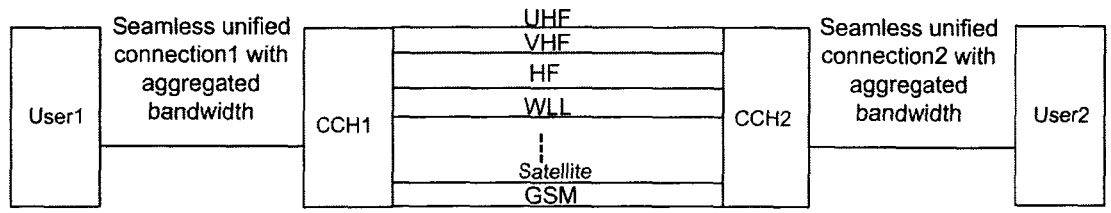
FIG. 2 shows various networking technologies available for end to end connection.

Referring to FIG. 2, where multiple networking technologies are provided by the CCH for the connection between user1 and user2. The communication between user1 and user2 can occur through either one of the available communication technologies or through hybrid of them depending on the quality of service required. Each link has its own bandwidth, speed, cost, network stability, node congestion and latency etc metrics. If a certain type of service requires high bandwidth then its bandwidth metric is given high priority when calculating compound metric. Compound metric is calculated on each node by using the formula:

$$CM_{TOSi} = \sum_{j=1}^{k} Pj_{TOSi} * RFj_{TOSi} \qquad 1$$

where CM stands for compound metric, i and j are integers; i is used to represent different type of service and j accounts for different routing factors, RF represents routing factors which are bandwidth, cost, latency, node congestion, network stability and speed etc and P stands for priority. Compound metric is calculated for each type of service. The link with the lowest metric is considered to be the most optimal path for the transfer of data.

Figure 3:
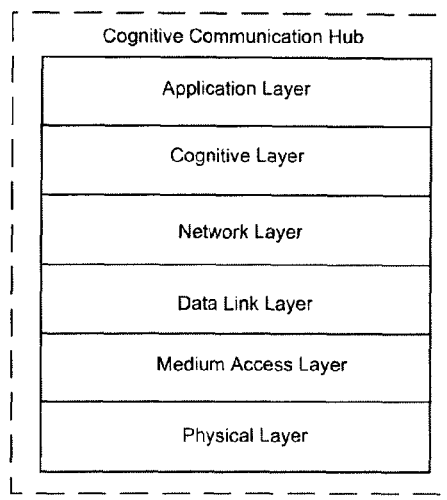
FIG. 3 is a high level depiction of protocol layers of Cognitive Communication Hub.

Referring to FIG. 3, a high level diagram of protocol layers of CCH is shown. The Application Layer contains applications like camera, ZIGBEE etc that can be used by other users through cognitive controller present in the Cognitive Layer. The intelligent Cognitive Layer primarily sits on top of the Network Layer and implements algorithms for transparent interconnection between different communication technologies. The Network Layer implements the different network layer protocols for each communication technology, e-g Satellite uses different networking technology than GPRS. The Data Link Layer provides the functional and procedural means to transfer data between network entities and also performs error detection and correction. The Medium Access Layer (MAC) provides the functionality for media access to each interface. The Cognitive Layer implements its own MAC, Data Link and network protocols and virtually places them in the network and MAC layers. The interfaces which primarily have their "built-in" MAC protocols preferably use their own MAC/Data Link protocols e-g WiFi, Ethernet etc. For those interfaces which do not have such option, e-g HF Broadcast radio, the user configures them to use the protocols of the cognitive layer. The Physical Layer transmits/receives data across the link.

Figure 4:
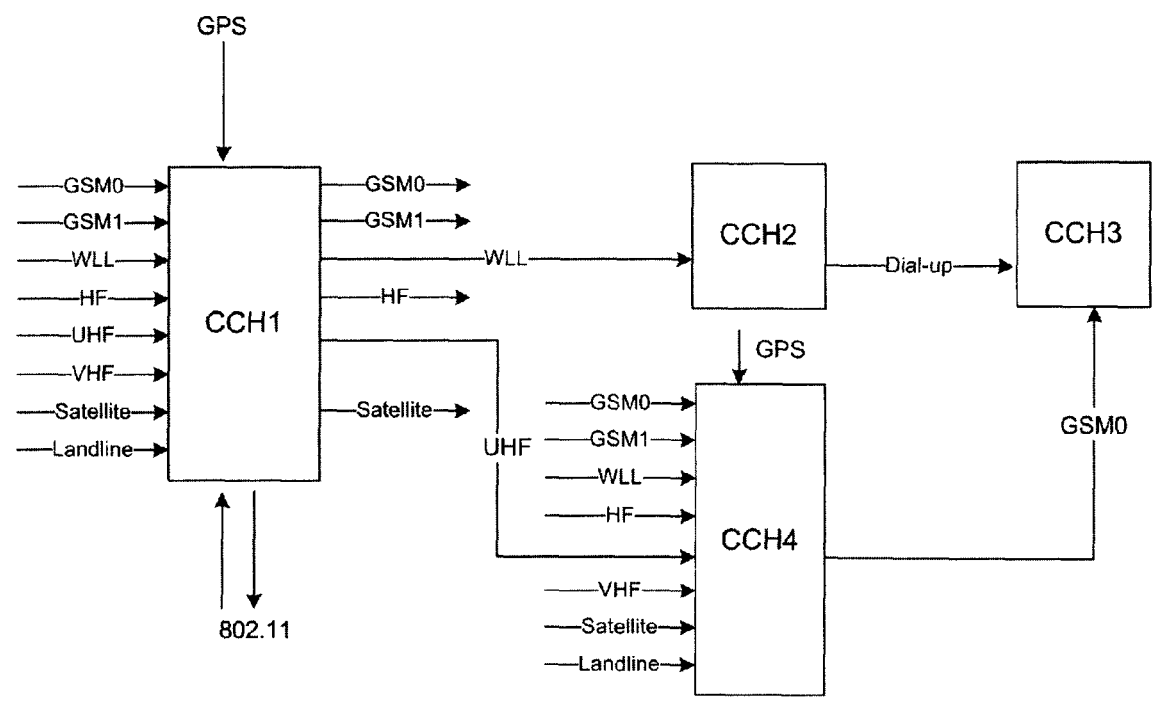
FIG. 4 shows diversity of CCH in travelling towards destination.

Referring to FIG. 4, four CCHs are shown. They have ten links between them which are: two GSM links, GSM0 and GSM1, WLL, HF, UHF, VHF, Satellite, Landline, GPS and Ethernet. Each link has its own bandwidth metric, latency metric, cost metric, speed metric, network stability metric and node congestion metric etc. Networking between any two CCHs of FIG. 4 can be done through any one of the ten possible links depending on the required QoS. The data to be transferred can be chat, SMS, FTP, VoIP, radar tracks and control orders etc. Each ToS demands different QoS, for instance, chat demands low delay but not high bandwidth, this means that its delay metric is given more priority than bandwidth metric. FTP demands high bandwidth, so bandwidth metric is given high priority while economic cost is kept low. SMS demands neither low latency nor high bandwidth. The compound metric calculation is based upon Type of Service (ToS). Each node maintains only that route which has best metric and a lower one as backup route. In this way best route is maintained. However, if the link with the highest priority is disconnected then the link with the second highest priority will be used and so on. An example scenario is shown in TABLE 1.

TABLE 1

| Interface | Compound Metric | |
|---|---|---|
| | TOS1 | TOS2 |
| GSM 0 | 13 | 25 |
| GSM 1 | 19 | 20 |
| WLL | 30 | 10 |
| HF | 11 | 40 |
| UHF | 5 | 30 |
| VHF | 9 | 15 |
| Satellite | 15 | 32 |
| Landline | 10 | 21 |
| GPS | 25 | 18 |
| Ethernet | 16 | 11 |

For the example case, any two ToS are used and their compound metrics are calculated. The most efficient link for any type of service is the one with the lowest metric. The compound metrics for both ToS 1 and ToS 2 are calculated by using eq 1.

$$CM_{TOS1} = P1_{TOS1}*RF1_{TOS1} + P2_{TOS1}*RF2_{TOS1} +$$

$$P3_{TOS1}*RF3_{TOS1} + P4_{TOS1}*RF4_{TOS1} +$$

$$P5_{TOS1}*RF5_{TOS1} + P6_{TOS1}*R6 5_{TOS1}$$

$$CM_{TOS2} = P1_{TOS2}*RF1_{TOS2} + P2_{TOS2}*RF2_{TOS2} +$$

$$P3_{TOS2}*RF3_{TOS2} + P4_{TOS2}*RF4_{TOS2} +$$

$$P5_{TOS2}*RF5_{TOS2} + P6_{TOS2}*RF6_{TOS2}$$

$CM_{TOS1}$ calculates the compound metric for type of service 1 and $CM_{TOS2}$ calculates the compound metric for type of service 2. Six routing factors are used for the example case which are: bandwidth, network stability, cost, delay, node congestion and speed. Each routing factor has its own priority, depending on ToS. As TABLE 1 shows, ToS1 will be using UHF because it has the lowest metric (meaning it is the most efficient link for this type of service). However if UHF has lost its connection then VHF will be used because it has the second smallest metric. If VHF is also disconnected then Landline will be used for communication. Similarly, ToS 2 is using WLL as the communication medium because it has the lowest metric. If WLL link drops then the second optimal route which is Ethernet will be used.

Referring to FIG. 4, two routes are shown that can be used for the transfer of information from CCH 1 to CCH 3. The two possible paths are:

First Path:

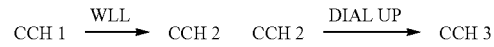

Second Path:

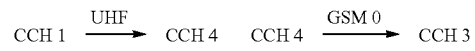

For first path, CCH 2 has its WLL not available. There can be any number of reasons for this, either WLL is temporarily disabled or there is so much congestion in the link that compound metric shows that WLL is no longer the optimal route. So, CCH 2 uses dial up for transmitting information to CCH 3. Similarly second path first uses UHF and then GSM 0 to reach CCH 3. Depending on the required QoS either first path or second path can be used.

Route establishment protocol is a modified version of proactive and reactive protocols and is called Cognitive Protocol. The modification is done for efficient heterogeneous interoperability between different communication technologies. The algorithm takes into consideration several factors when building routes such as cost, latency, node congestion, bandwidth and speed etc. Moreover, security is provided by giving a "don't route" priority to public links and CCH will never use those links for secret type of data. The secret data will be routed through private routes.

CoS (Class of Service) is provided by managing priority queues on interfaces. For example in military applications radar tracks are coming every other second, if some of the tracks are even missed, still it is not a serious problem but, if the command orders are missed or not sent on time then it can create serious problem. For this reason data is prioritized. If a common link is to be used for the transmission of two different types of data at the same time, then the data with the highest priority is transmitted first.

Figure 5:
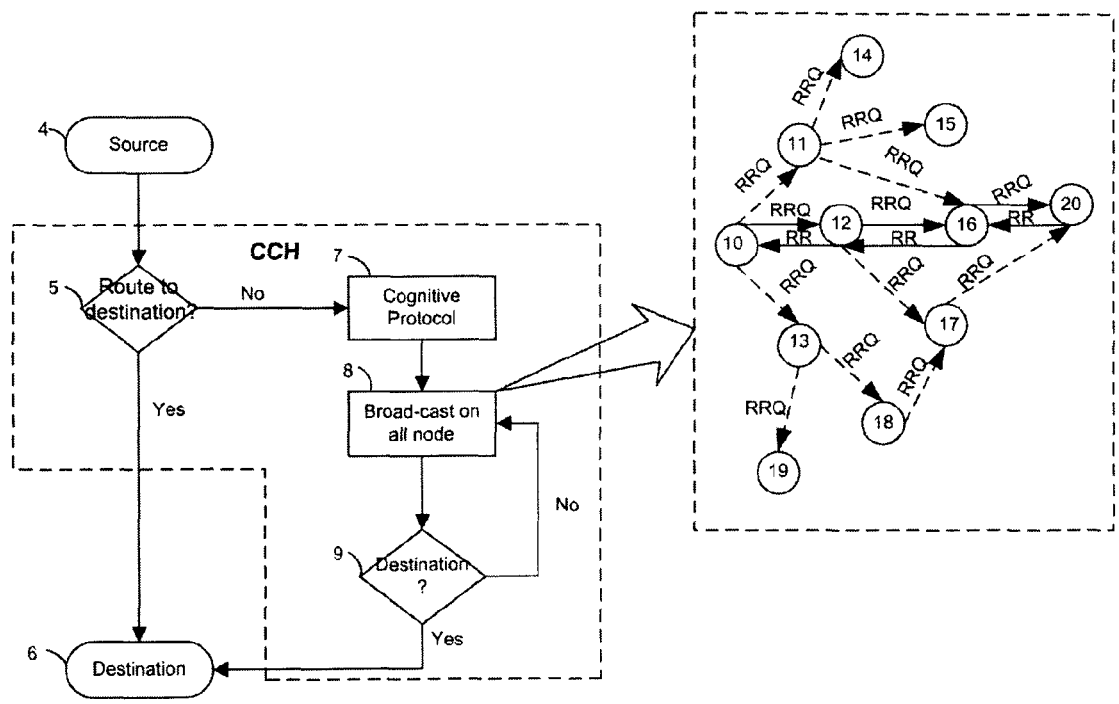
FIG. 5 shows how Cognitive Protocol works.

Referring to FIG. 5, a flow graph is shown for the transfer of information packet from its source to destination. Step-4 SOURCE is transmitting a packet. CCH checks whether it has a route for its destination or not, indicated by step-5. If it has a route then it is transferred to step-6 DESTINATION, via respective interface otherwise step-7 COGNITIVE PROTOCOL invokes and broadcasts ROUTE REQUEST query (RRQ) over all interfaces indicated by step-8. RRQ represents route request query and RR represents Route Response in FIG. 5. Different metrics are used in RRQ to represent different costs such as bandwidth, delay, economic costs, node congestion, network stability and speed etc. These metrics are set to zero before transmission. ToS (Type of Service) is also described in RRQ. When route request query reaches its neighbors, they look at the ToS and calculate the total metric as per QoS requirement and add backward route towards source. If any one of them is the destination then it stops broadcasting and generates a ROUTE RESPONSE (RR) query towards originator (source) otherwise it broadcasts further. This is indicated by step-9. After the route is established, CCH starts transferring data. Compound metric calculation is performed at each node and best path is maintained. The solid arrows of FIG. 5 shows the path that is used to send data, whereas dotted arrows shows other routes which are not used to transfer information because they are not optimal paths. The optimal path for the transfer of information is shown in the figure and it is:

10→12→16→20

Any next query received after the previous one, gives a new metric. If new metric is better than previous one, then query is updated and broadcast further otherwise it is dropped and previous route is maintained. Separate routing tables are maintained for each ToS which makes it easier to handle the requirement of QoS. By taking discrete metrics in the query, and updating all metrics at each intermediate node, the best route is formed. So CCH sends data on its best interface and it also knows the overall end-to-end path metric.

Figure 6A:
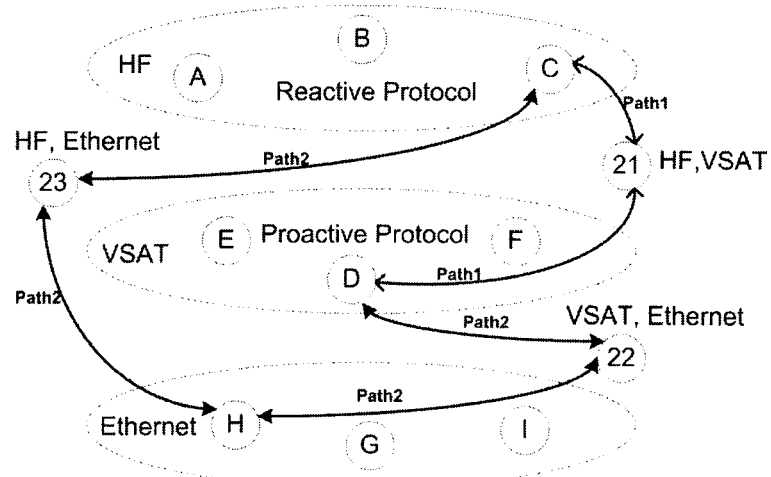
FIGS. 6A and 6B show the transmission of data packets through different technologies.

Referring to FIG. 6A, the working of cognitive controller is shown. The figure shows three layers that are: HF layer, VSAT layer and Ethernet layer. Each layer has a different protocol. HF has a reactive protocol, VSAT has a proactive protocol. HF layer has three nodes in it which are A, B and C. The nodes of VSAT layer are D, E and F and the nodes of Ethernet layer are G, H and I. Node 21 is a hybrid node as it has both HF and VSAT technologies and, therefore, is present in both layers. So it acts as a connecting node between HF and VSAT layers. Similarly, Node 22 lies between Ethernet and VSAT, and node 23 lies between HF and Ethernet layers. Each node has either a single or multiple communication technologies incorporated in it. These are listed in Table 2.

TABLE 2

| Nodes | Networking Technologies | | |
|---|---|---|---|
| Node A | HF | | |
| Node B | HF | | |
| Node C | HF | | |
| Node 21 | HF | VSAT | |
| Node D | | VSAT | |
| Node E | | VSAT | |
| Node F | | VSAT | |
| Node 22 | | VSAT | Ethernet |
| Node G | | | Ethernet |
| Node H | | | Ethernet |
| Node I | | | Ethernet |
| Node 23 | HF | | Ethernet |

Now if node A, B and C wants to communicate with each other, they will simply use HF to carry out communication, same is the case for the communication between nodes D, E, F and nodes G, H, I. For the communication between any two nodes of same technology, Cognitive Controller simply uses the routing table of that technology. For instance, if node A and node B wants to communicate with each other then cognitive controller looks for the routing path in HF table and assign the path. But if node C wants to communicate with node D, then cognitive controller initiates Cognitive Protocol (as node C and D have different communication technologies) and finds path from node C to node D. Since node 1 has both HF and VSAT, so node C after encrypting the data, sends information to node 21 through HF. Then node 21 sends information to node D through VSAT. Another path is also possible for the transfer of information. Node C sends information to node 23 through HF, node 23 can use any node in Ethernet layer to send information, depending upon the compound metrics. For this particular case, node H has the best metrics so node 23 transfers information to node H. Node 22 can communicate through both VSAT and Ethernet so node H communicates with node 22 via Ethernet. After this node 22, via VSAT sends information to node D which is the destination node. Thus the two paths are:

Path 1:

Node C (Source Node) $\xrightarrow{HF}$ Node 21 $\xrightarrow{VSAT}$ Node D

Path 2:

Node C $\xrightarrow{HF}$ Node 23 $\xrightarrow{ETHERNET}$ Node H

Node H $\xrightarrow{ETHERNET}$ Node 22 $\xrightarrow{VSAT}$ Node D

The optimal path (for this particular case) is path 1, so this is used for the transfer of information between node C and node D.

Figure 6B:
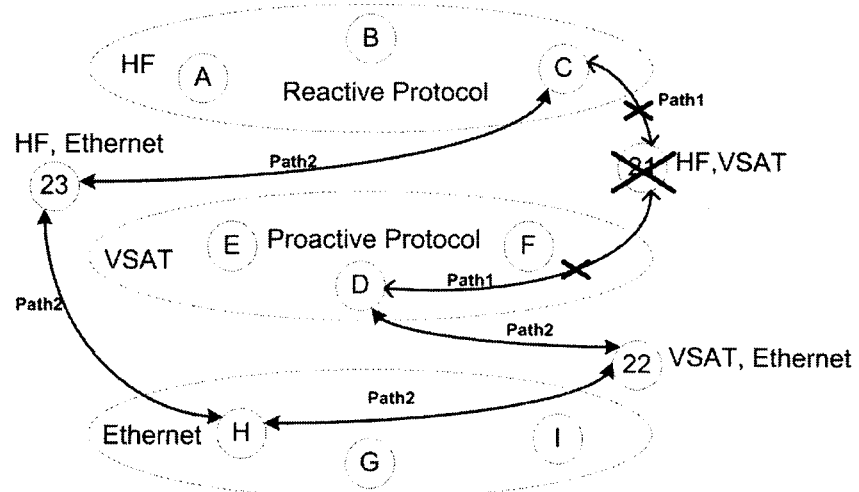

Referring to FIG. 6B, Node 21 is disabled. Now in order to transfer information from node C to node D, path 2 is the only choice and the transfer of information occurs through this path.

Figure 7:
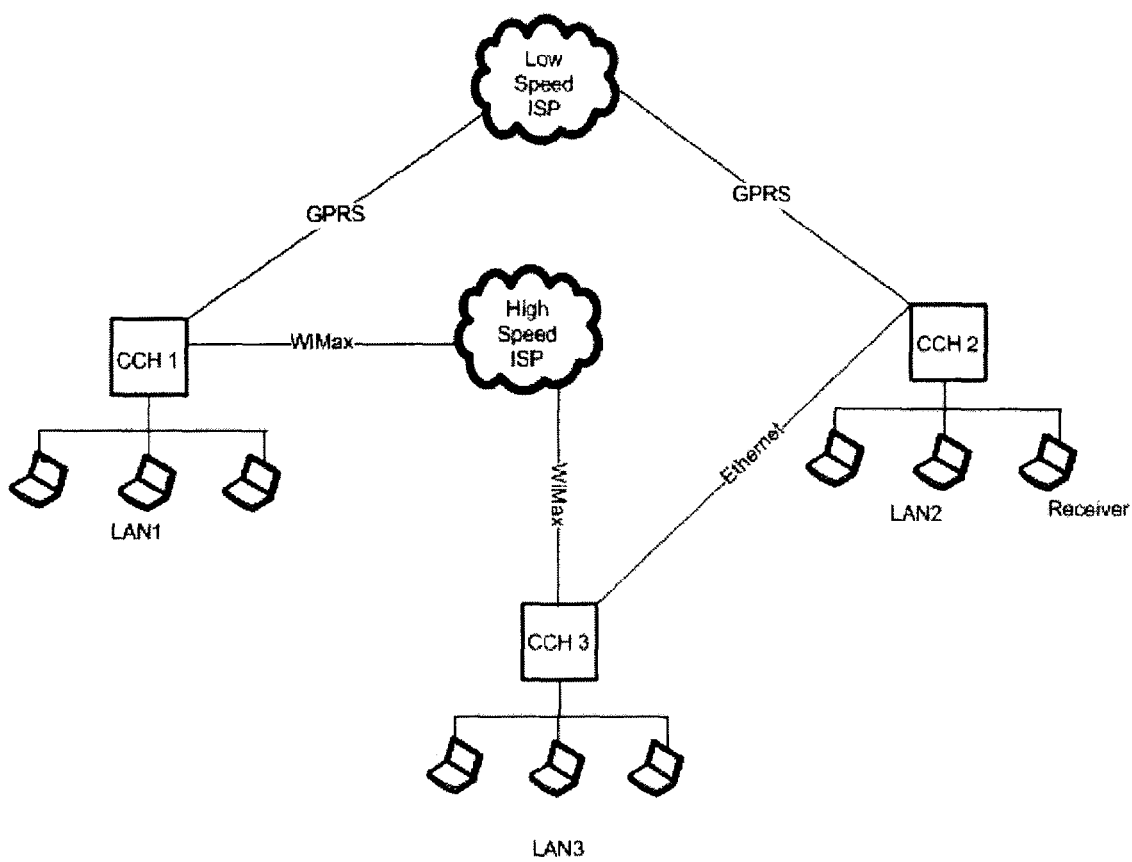
FIG. 7 is an example scenario that describes how best end to end route is established.

Referring to FIG. 7, an example of a network in which three LANs are interconnected is shown. Suppose a computer in LAN1 wants to transfer some data to a computer in LAN2. Although CCH1 can connect to CCH 2 via GPRS link and route can be established that way but, CCH 1 uses its "per hop" metric calculation to establish best possible route. During the calculation of compound metric, FTP gives high priority to WiMax and Ethernet links and SMS/chat gives high priority to economic cost. So following routes will be established;

For FTP:

CCH 1 $\xrightarrow{WiMax}$ CCH 3    CCH 3 $\xrightarrow{ETHERNET}$ CCH 2

For SMS/chat:

Hence each type of service selects the optimal route on the basis of the quality of service required.

The embodiment described relates to the development of a device that can integrate multiple communication technologies with the ability to plug in any upcoming networking technology in it, while providing quality of service and class of service. The routing protocol for the device is designed to explore the best route that can optimally use hybrid networking technologies for making a connection. The device uses multiple parallel data paths so a disconnection in one path does not cause a break down, thus providing fault tolerance.

The invention claimed is:

1. A Cognitive Communication Hub comprising:
   a. A plurality of physical interfaces integrated to make a simple unified interface to the user;
   b. A processor;
   c. A memory device storing a plurality of instructions which, when executed by the processor, cause the processor to operate with at least one of the plurality of physical interfaces to implement intelligent cognitive software performing the steps of:
      i. creating a self-forming and self-healing network based on a plurality of layers consisting of a high frequency layer, a very small aperture terminal layer, a WiFi layer, a very high frequency layer, a dialup layer, a global system for mobile communications layer and an Ethernet layer;
      ii. allowing multi-hopped connections and selection of physical medium based on the Quality of Service and Class of Service requirements;
      iii. operating the network without specifying a static setting other than deployment settings;
      iv. re-routing in case of loss of a link;
      v. implementing medium access layers; and
      vi. developing routing across multiple physical networks in a 3D space, where multiple networks are different layers in third dimension and physical devices are geographically placed in x-y planes; and
   d. A routing protocol interface that is capable of:
      i. using multiple hybrid links for making a connection;
      ii. providing band width aggregation by forming multiple parallel data paths between source and destination and using all the links in parallel for the transfer of information;
      iii. providing fault tolerant end to end communication by using back up routes; and
      iv. incorporating multicast and broadcast routing.

2. The hub according to claim 1, wherein the hub forms tunnels through underlying network layers and is independent of underlying network protocols.

* * * * *